(12) United States Patent  
Sola et al.

(10) Patent No.: US 11,606,146 B2  
(45) Date of Patent: Mar. 14, 2023

(54) WIDE APERTURE OPTICAL COMMUNICATIONS

(71) Applicant: ARCHANGEL LIGHTWORKS LTD., Harwell (GB)

(72) Inventors: Daniel John Peter Sola, Oxford (GB); Owain Pryce-Jones, Oxford (GB)

(73) Assignee: Archangel Lightworks Ltd., Harwell (GB)

( * ) Notice: Subject to any disclaimer, the term of this patent is extended or adjusted under 35 U.S.C. 154(b) by 0 days.

(21) Appl. No.: 17/490,710

(22) Filed: Sep. 30, 2021

(65) Prior Publication Data

US 2022/0190923 A1  Jun. 16, 2022

Related U.S. Application Data

(63) Continuation of application No. 17/043,501, filed as application No. PCT/GB2019/050940 on Mar. 29, 2019, now Pat. No. 11,165,503.

(30) Foreign Application Priority Data

Mar. 29, 2018 (GB) ...................................... 1805275

(51) Int. Cl.  
  *H04B 10/00* (2013.01)  
  *H04B 10/50* (2013.01)  
  (Continued)

(52) U.S. Cl.  
  CPC ............. *H04B 10/501* (2013.01); *G02B 3/08* (2013.01); *G02B 5/10* (2013.01); *G02B 26/0875* (2013.01);  
  (Continued)

(58) Field of Classification Search  
  CPC ... H04B 10/11; H04B 10/112; H04B 10/1123; H04B 10/1125; H04B 10/1127;  
  (Continued)

(56) References Cited

U.S. PATENT DOCUMENTS 5,392,157 A   2/1995  Shih  
6,577,421 B1  6/2003  Cheng  
          (Continued)

FOREIGN PATENT DOCUMENTS

EP  2290993 A1  3/2011  
GB  2329483 A   3/1999

OTHER PUBLICATIONS

International Search Report and Written Opinion for Application No. PCT/GB2019/050940 dated Aug. 20, 2019 (19 pages).

(Continued)

*Primary Examiner* — Hanh Phan  
(74) *Attorney, Agent, or Firm* — Michael Best & Friedrich LLP

(57) ABSTRACT

A plurality of electromagnetic radiation capture units are positioned under a focusing unit such as a dome, such that incoming electromagnetic radiation incident on the dome is deflected by it, to reach each of the capture units with a different timing and intensity. The profile for the timings and intensities can be determined for a given transmitter using a calibration signal, and the profile is then used to extra data from data signals transmitted by the transmitter.

21 Claims, 8 Drawing Sheets

(51) Int. Cl.
*G02B 3/08* (2006.01)
*G02B 5/10* (2006.01)
*G02B 26/08* (2006.01)
*G02B 27/30* (2006.01)
*H04B 10/112* (2013.01)
*H04B 10/60* (2013.01)

(52) U.S. Cl.
CPC .......... *G02B 27/30* (2013.01); *H04B 10/112* (2013.01); *H04B 10/60* (2013.01)

(58) Field of Classification Search
CPC .............. H04B 10/1129; H04B 10/114; H04B 10/1143; H04B 10/1149; H04B 10/118; H04B 10/116; H04B 10/40; H04B 10/60; H04B 10/501
USPC ....... 398/118, 119, 120, 121, 122, 123, 124, 398/125, 126, 127, 128, 129, 130, 131, 398/135, 136, 33, 38, 158, 159, 202, 208, 398/209, 172, 201, 212
See application file for complete search history.

(56) References Cited

U.S. PATENT DOCUMENTS

| | | | |
|---|---|---|---|
| 6,625,339 B2* | 9/2003 | Weis | .................. H04B 10/1143 385/16 |
| 6,704,509 B1* | 3/2004 | Yang | ................ H04B 10/07955 398/131 |
| 7,787,016 B2 | 8/2010 | Tholl | |
| 8,496,354 B2 | 7/2013 | Jurik et al. | |
| 9,584,226 B2* | 2/2017 | Polster | .................. H04B 10/541 |
| 2002/0196506 A1 | 12/2002 | Graves et al. | |
| 2003/0067657 A1 | 4/2003 | Dimmler | |
| 2003/0179804 A1 | 9/2003 | Cook et al. | |
| 2005/0100339 A1 | 5/2005 | Tegge, Jr. | |
| 2006/0076473 A1 | 4/2006 | Wilcken et al. | |
| 2015/0349881 A1* | 12/2015 | Byers | ............... H04B 10/07955 398/118 |
| 2016/0028479 A1 | 1/2016 | Ren et al. | |
| 2016/0112124 A1* | 4/2016 | Juarez | .................. H04B 10/112 398/118 |
| 2017/0025753 A1 | 1/2017 | Driscoll et al. | |
| 2017/0285357 A1 | 10/2017 | Huang | |
| 2018/0158703 A1 | 6/2018 | Aslanov | |
| 2020/0127738 A1 | 4/2020 | Nakao | |

OTHER PUBLICATIONS

Search Report issued by the United Kingdom Intellectual Property Office for Application No. 1805275.3 dated Mar. 4, 2019 (2 pages).
Search Report issued by the United Kingdom Intellectual Property Office for Application No. 1805275.3 dated Sep. 11, 2018 (4 pages).
International Preliminary Report on Patentability for Application No. PCT/GB2019/050940 dated Oct. 8, 2020 (12 pages).
European Patent Office Action for Application No. 19716533.5 dated Jan. 27, 2023 (5 pages).

* cited by examiner (a)          (b)

WIDE APERTURE OPTICAL COMMUNICATIONS

CROSS-REFERENCE TO RELATED APPLICATIONS

This application is a continuation of co-pending U.S. patent application Ser. No. 17/043,501, filed Sep. 29, 2020, which is a U.S. national stage of PCT Patent Application No. PCT/GB2019/050940, filed Mar. 29, 2019, which claims priority to British Patent Application No. 1805275.3, filed Mar. 29, 2018, the entire content of all of which are incorporated herein by reference.

FIELD OF THE INVENTION

The present invention relates to a communication system, and in particular to a transmitter and/or receiver unit for a communication system. It further relates to a beam steering device for use in such a transmitter and/or receiver unit. It further relates to a method for performing data communication in an optical communication system.

BACKGROUND OF THE INVENTION

Free space optical communications is an optical communication technology that uses electromagnetic radiation (EMR, also referred to here as "light") propagating in free space to wirelessly transmit data for telecommunications or computer networking. The electromagnetic radiation referred to in this document is typically radiation with a frequency in the microwave band (e.g. at least 300 MHz) or higher frequencies, such as the visible light band (430-750 THz). In particular, the EMR may be infrared radiation, in the range 300 GHz (1000 micrometers) to 430 THz (700 nanometers), such as 1550 or 1064 nanometers. All these frequencies are here referred to as "optical" frequencies. The electromagnetic radiation is typically generated by a laser source, and transmitted as a focused beam (though the methods would apply to other sources such as LEDs). Free space optical communication offers much higher data rates than radio for long range communication but has several downsides.

One of these is that to establish a link the transmitting telescope and receiving telescope must be pointed accurately towards each other, so that a complex calibration operation is required to align the two (typically called 'acquisition'). If one of the telescopes is moving relative to the other (e.g. if one of the telescopes is mounted on a satellite or an aircraft), the alignment operation must be performed repeatedly or continuously (typically called 'tracking'). As a result, high accuracy, high cost, pointing, acquisition and tracking (PAT) systems are a major design driver and limiting factor for optical communications.

Another disadvantage is that at the receiving telescope the incoming beam can be of low intensity, so that the receiving telescope must have a wide aperture to capture a significant proportion of the available light. However, wide aperture telescopes tend to be heavy, and traditional methods of performing the alignment operations (pointing, acquisition and tracking) involve steering large tracking mirrors and/or moving the whole telescope.

The alignment process typically involves at least one of the telescopes generating a beacon beam with known optical properties, which is recognised at the other telescope to provide a positioning reference, which facilitates an initial signal acquisition stage and subsequent tracking. Link acquisition time reduces the usable link time. Accurate pointing is difficult particularly for larger aperture or heavier telescopes which are needed to collect faint (distant) signals. The pointing challenge is amplified if higher control speeds are needed to deal with perturbations and movement. If more than one link is needed simultaneously on a platform, multiple telescopes with independent pointing and tracking mechanisms must be fitted.

It is known in the art to use multiple optical beams to characterise, in real time atmospheric distortions. This is typically achieved by transmitting 'beacons' up from the ground (these double as locating signals for active pointing control). The beacon signal distortions are measured and the transmitted beam is 'pre-distorted'. These methods do nothing to facilitate spatial division multiplexing, nor do they account for wavefront distortion or power distribution through wide angle and/or wide aperture and/or high aberration optics.

SUMMARY OF THE INVENTION (i) First Aspect

In general terms, a first aspect of the present invention proposes that a focusing device for a transmitter and/or receiver unit of a communications system comprises lens arrays (a lens array being an array composed of multiple lens elements moved together and typically mutually retained—e.g. by a support structure, and/or by being respective parts of an integral body—in a generally side-to-side configuration) moving relative to each other. The method is applicable to any size of lens array, particularly to microlens arrays (MLAs). One group of embodiments includes two lens arrays which work together to steer a transmitted or received beam. The MLAs are arranged in a configuration in which electromagnetic radiation (EMR) incident on one of the MLAs passes through it, and is transmitted by it to the other MLA. An actuator device is provided to move at least one of the MLAs relative to the other. This permits the focusing device to control a transmitted beam and/or a reception direction from which a beam can be received.

The motion may include independently controllable translation along 1, 2 or 3 orthogonal axes. Alternatively or additionally, the motion may include rotation of one of the MLAs relative to the other, e.g. about an axis which is parallel to, or lies in, a plane of one of the MLAs, or about a centre of curvature shared by the MLAs. Especially in the case that the focal surface of the optical system is curved (non-planar), the actuator may conveniently be controlled to perform multiple ones of the translational motion(s) and/or rotational motions as part of a single operation, e.g. simultaneously.

For example, where MLAs are used they may be planar, and in this case a translation of one of the MLAs with respect to the other can steer the beam. Furthermore, the divergence of the transmitted beam, or the receptive field in the case of a receiver, can be varied by an angular variation of the MLAs with respect to each other about an axis which is parallel to one of the MLAs.

The first aspect of the invention also provides a receiver unit incorporating the focusing device, a transmitter unit incorporating the focusing device, and/or a communications device incorporating at least one such receiver unit and/or at least one such transmitter unit. Note that a single unit incorporating the focusing device may function both as a receiver unit and a transmitter unit (i.e. as a transceiver unit), e.g. if it includes both EMR capture unit(s) and EMR generating unit(s) arranged with respect to respective focusing devices, or a single common focusing device. In the case that a single focusing device as described above is arranged to focus EMR for both EMR capture unit(s) and EMR generating unit(s), the focal plane of the EMR capture units may be different positions with respect to the focusing device, e.g. at different focal surfaces, so as to provided different beam divergences in the transmitting and receiving directions.

The term "face to face" is used to cover a situation in which two (e.g. planar) MLAs are substantially parallel, but also covers a situation in which they are offset at an angle but such that a normal direction to a portion of a major surface of one of the MLAs intercepts with a major surface of other MLA. If the MLAs are planar, the actuator may be operative to move them to at least one position in which the angle between the normal directions to their respective planes is less than 10 degrees, or less than 5 degrees, or less than one degree.

More generally, the focusing unit may include additional lenses or lens arrays. For example, it may include a set of at least three MLAs arranged in a stack, such that each is face-to-face with one or two other of the MLAs, and at least one of the MLAs is movable by the actuator relative to the other(s). However, including more than two face-to-face lens arrays in the focusing unit may be disadvantageous in some cases, e.g. it may increase optical losses.

In preferred forms of the invention, the focusing device allows the transmitter and/or receiver unit to provide a wide aperture collection optic. The aperture may, for example, be as wide in a certain direction as a length of the outermost lens array (i.e. the lens array which the rays encounter first) in that direction. The beam transmission/reception direction of the wide aperture collection optic can be steered, such as over a wide range of angles. Furthermore, in addition to the wide collection aperture, the focusing device may have low overall mass, low cost optics and/or low steering control inertia.

Note that a MLA is typically provided as an array of optical elements which has a periodicity in at least one direction which is characterized by a repeat distance. Where MLAs are used, the beam may be steered in the plane including in at least one direction by a translational movement of one MLA relative to the other which is typically less than the repeat distance. This is typically a much smaller distance than the distance which at least part of a conventional telescope has to be moved to steer the beam by the same angle, which is at least on the scale of the aperture of the telescope. Optionally, the motion may be incremental (i.e. with discontinuities), e.g. to match tracking of a transmitter at intervals. Note that a traditional telescope must be accurately pointing at the transmitter, but the present embodiments may permit collection of light on the collection aperture at a more oblique angle. An application of the first aspect of the invention is a communications system for a geostationary satellite optical feeder link. Optionally, a plurality of the focusing devices may be positioned in an array, such as a regular array, each of the focusing devices being provided with circuitry for generating modulated electromagnetic radiation, and/or for receiving electromagnetic radiation and extracting a signal modulated onto the electromagnetic radiation.

In one form, a focusing unit for an EMR transmitter/receiver unit may include multiple sets of MLAs, which may each be designed to receive light from a respective wide field of regard, such as one defined by an angular cone of width in any direction about its axis of at least 1 degree, at least 2 degrees, at least 5 degrees, at least 10 degrees, at least 20 degrees, at least 30 degrees or at least 40 degrees. Each set of MLAs may be provided for use with at least one respective EMR generation unit and/or capture unit. Alternatively, more than one of the sets of MLA may share a common EMR generation unit and/or a common detector or detector array. These multiple sets of optics can be arranged as "tiles" to, in aggregate, cover a wide field of view. In some communications systems, this tiled system permits multiplexing of received/transmitted signals, e.g. communications are established to a mobile station such as a Low Earth Orbit (LEO) satellite in one tile, with transmission and/or reception handed off to an adjacent tile as the mobile station moves. This allows multiple tiles to communicate with multiple stations simultaneously and is a form of spatial division multiplexing (SDM).

Optionally, the lens arrays may make use of elastic or otherwise deformable lenses, so that their optical properties can be adjusted by a control signal input. This would allow optical properties and therefore performance to be tuned depending on the input beam properties, including input incidence angle.

(ii) Second Aspect

Whereas the first aspect of the invention relates to steering an EMR beam, the second aspect of the invention is not limited to systems in which an EMR beam is steered, and indeed may make possible unsteered communications at high data rates and at long range. In particular, the second aspect of the invention makes possible, in one application, a wide aperture, wide acceptance angle receiver unit (which may be, but is not necessarily, dome shaped) that does not need to be mechanically steered and can receive and separate multiple signals using spatial multiplexing methods.

Thus, the calibration signal may be used for calibration to facilitate correct interpretation of the data signal. The calibration may be dynamic calibration (live calibration or derived via calculation).

In general terms, a second aspect of the invention proposes a data transmission method for an optical communications system comprising at least one transmitter unit and a receiver unit, the receiver unit comprising at least one receiver which comprises a set ("array") of two or more EMR capture units ("detectors") and a focusing unit for focusing EMR onto the corresponding set of EMR capture units. Each transmitter unit transmits at least two EMR signals to the receiving unit, including a calibration signal and a data signal, the calibration signal having at least one characteristic which is different from the data signal. Using outputs of the EMR capture units when the calibration signal is incident on the receiving unit, a corresponding profile for the transmitter unit is determined, which indicates wave front distortion and power distribution over the EMR capture units. The profile is used to extract data from the outputs of the EMR capture units when a data signal from the corresponding transmitter unit is incident on the receiving unit.

The calibration signal may be transmitted at a different time from the data signal, or at the same time as the data signal. If they are transmitted simultaneously they may be transmitted in slightly different frequency bands (e.g. in, in the case that the transmitters are designed to use a communication protocol which defines a set of frequency channels, in adjacent channels), such as non-overlapping bands, and the EMR capture units may be operative to output a different electronic signal in respect of each frequency band.

Due to at least one characteristic, the calibration signal is distinguishable from the data signal and can therefore be separated from the data signal by timing, polarisation, wavelength, power (amplitude), phase, coding, waveform or some other characteristic. In particular, the at least one characteristic may be pre-known (or selected from a group of possible characteristics which is pre-known), and may for example be that the data transmission rate of the calibration signal is lower than that of the data signal. It is important that the calibration signal be resolved in order to allow a higher rate data signal to be resolved. This would normally imply a higher peak power for the calibration signal.

Each transmitter unit may contain one or more transmitter elements ("transmitters"). The transmitters of a single transmitter unit are "co-located", i.e. sufficiently close to each other that at the receiver unit they have substantially the same wave distortion and power distribution over the EMR capture units. Thus, the same profile describes signal transmission from each of the transmitters to the receiver unit. Optionally, the calibration signal and the data signal for a given transmitter unit may both be transmitted to the receiver unit by the same transmitter, in which case the calibration signal may be embedded in the data signal. Alternatively, the calibration signal and the data signal for a given transmitter unit may be transmitted by different transmitters.

Similarly, the receiver unit contains multiple EMR capture units (termed 'collectors' or 'receivers' or 'detectors') to profile the power distribution of the calibration signal. If two or more sets of EMR capture units are used to accept calibration and data signals independently, the EMR capture units are sufficiently close to each other, and relatively orientated such that, for a given transmitter unit, the wave distortion and power distribution is the same for receivers accepting both calibration and data signal beams. Thus, the profile for a given transmitter unit is the same for each set of EMR capture units. Where the calibration and data signal are transmitted by the same transmitter with a different characteristic, e.g. separated in time, a single set of EMR capture units can fulfill this purpose.

The calibration signal may take a predetermined form, such as a pulse followed by a gap. Such a signal is designed to be easy to detect whilst maintaining low average power. The data rate on the calibration signal is very low, such as substantially zero.

In some embodiments additional types of signals may be generated by a given transmitter unit and transmitted to the receiver unit. For example, there may be multiple calibration signals, and/or multiple data signals, such as data signals in different frequency ranges.

In a further variation, rather than the calibration signal transmitting substantially no data, it may transmit data at a rate which is non-zero, but less than that of the data signal.

The focusing device of a given receiver may be a wide angle aperture, which is able to direct EMR falling onto it at a wide range of incident angles (e.g. at least 5 degrees, 30 degrees, at least 60 degrees, at least 90 degrees, or even at least 120 degrees) towards the corresponding set of EMR capture units. The focusing device may comprise a structure subtending at least this wide range of angles about the corresponding set of EMR capture units. For example, the focusing structure may be formed as a dome covering the set of EMR capture units. The dome may, for example, comprise a dome-shaped Fresnel lens and/or at least one microlens array. The focusing device preferably defines a focal plane, and the set of EMR capture units lie within that focal plane.

Traditionally, satellite optical communications are coordinated over radio, which still requires licensing. The second aspect of the invention may alleviate or bypass the need for spectrum coordination and even link coordination, since the wide angle device may be arranged to listen in a wide range of directions all the time. The second aspect of the invention may be used in combination with more traditional telescopes or with the first aspect of this invention, where the wide angle receiver is used to establish an initial link with minimal prior coordination and the more directional receiver is cued to establish a higher data rate link.

The second aspect of the invention may also address a problem of conventional systems that, due to the highly directional nature of conventional free space optical communications, multiplexing of signals from different transmitter units into the same receiver has been difficult. The second aspect of the invention makes possible a system in which multiple signals can be received simultaneously from different transmitter units, even if the transmitter units have different positional relationships with respect to the receiver unit.

In one case, the signals may be multiplexed by the transmitter units using different respective (e.g. predetermined and/or non-overlapping) frequency bands.

However, in a more preferred case, the signals can be "spatially multiplexed", i.e. resolved from each other using the respective profile for each transmitter unit. Thus, by calibrating for power and timing, multiplexing from multiple transmitter units to one wide angle, un-steered receiver unit is possible, benefiting from the fact that the multiple transmitter units have different respective positional relationships with respect to the receiver unit.

Optionally, the system may comprise one of more spectral filters, including at least one filter of each of multiple types (that is, having different respective frequency transmission characteristics).

For example, in a given receiver, the EMR capture units may be provided with filters of multiple corresponding types (i.e. such that different ones of the EMR capture units have filters of different types). In the case of a receiving unit with multiple receivers, the pattern of filters is preferably the same for each of the receivers.

In the case that a given transmitter unit contains a plurality of transmitters, the transmitters may generate EMR in different respective frequency ranges. For example, the transmitters may be formed with different respective EMR generation units (e.g. one or more LEDs, laser diodes or other laser devices) and/or different respective filters.

The second aspect of the invention is particularly suitable for communications to and from space (e.g. from and to the ground), and for inter-satellite communication links. It is also suitable for situations in which the receiver and/or transmitter units are located on an aircraft.

The second aspect of the invention may be expressed as a communication method, as a communication system, as a receiver unit for a communication system, or as a novel transceiver arrangement. The two aspects of the invention may be used in combination as the lens array implementation will 1) incur aberrations that distort the wavefront within the optical chain, dependent on relative orientation of the two communicating stations and 2) could be implemented in a tiled arrangement, focusing light onto a shared array of detectors. The second aspect is particularly useful for correcting wavefront distortions within an optical system of wide aperture (and, therefore, path length differences), wide angle (with variation in power distribution) and relatively high amounts of aberration (which can affect both wavefront and power distribution).

BRIEF DESCRIPTION OF THE DRAWINGS

Embodiments of the invention will now be described for the sake of example only with reference to the following figures in which:

FIG. 8 shows schematically a communications system which is an embodiment of the second aspect of the invention;

DETAILED DESCRIPTION OF THE EMBODIMENT (i) First Aspect

Figure 1:
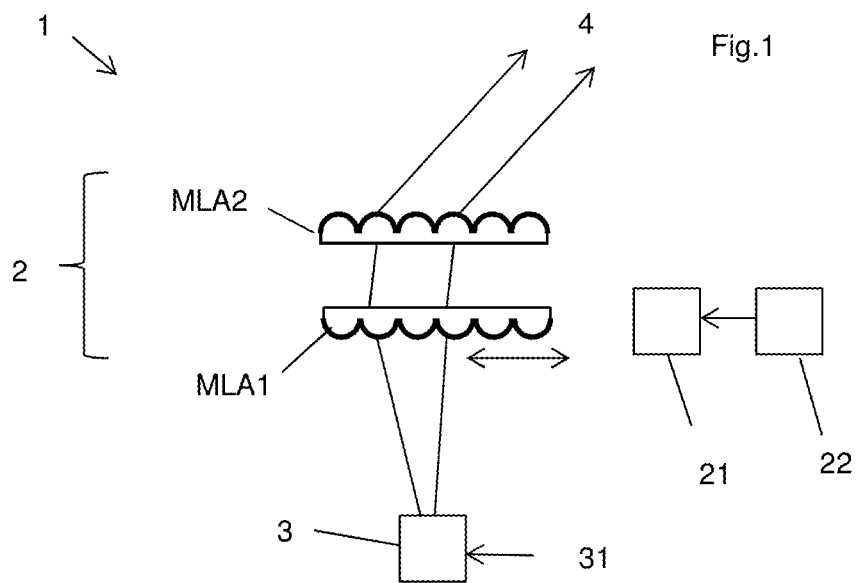
FIG. 1 shows schematically a transmitter unit which is an embodiment of the first aspect invention, and which incorporates a focusing device which is a further embodiment of the first aspect of the invention.

FIG. 1 shows an embodiment of the first aspect of the invention which is a transmitter unit 1. The transmitter unit 1 includes a focusing unit 2 which is also an embodiment of the invention. The focusing unit 2 is positioned in relation to an electromagnetic radiation (EMR) generation unit 3 which is capable of generating EMR which is modulated by a data signal 31. The EMR generation unit 3 is at a focal point of the focusing unit 2.

The EMR generation unit 3 typically includes one or more LEDs, laser diodes or other emitting devices, which are operative to generate light based on a control signal modulated with the data signal. The electromagnetic radiation is typically radiation with a frequency in the microwave band (e.g. at least 300 MHz) or higher frequencies, such as the visible light band (430-750 THz). In particular, the EMR may be infrared radiation, in the range 300 GHz (1000 micrometers) to 430 THz (700 nanometers), such as 1550 or 1064 nanometers. (The EMR generation unit 3 may include one of more focusing units (not shown), such as lens(es), and/or parabolic mirror(s).

The reference numeral 4 designates rays of EMR which are generated by the EMR generation unit 3, and transmitted through the focusing unit 2 which focuses the EMR into a beam; or a ray of light The focusing unit 2 includes two micro-lens arrays (MLA1, ML2). The MLAs may each be substantially planar, and arranged parallel to each other, spaced apart. Each of the MLAs may be spatially periodic in at least one periodicity direction, and the periodicity direction(s) for MLA1 may be parallel to corresponding periodicity direction(s) of MLA2. In each periodicity direction, the period of MLA1 and MLA2 may be the same.

The focusing unit also includes at least one actuator 21 for moving the MLA 1 relative to MLA2 under the control of a control unit 22. In one possibility, the MLA2 is static relative to the EMR generation unit 3. The motion of the MLA 1 caused by the actuator 21 preferably includes at least a translational motion of the MLA1 in at least one movement direction which is transverse to the spacing direction of the MLAs. In the case that there is only one movement direction, it may be parallel to the periodicity direction of MLA1 and MLA2. However, more preferably, the actuator 21 is capable of moving MLA1 relative to MLA2 to an independent controllable degree in each of two periodicity directions (e.g. orthogonal directions) transverse to the spacing direction, such that the beam can be steered independently in both directions transverse to the spacing direction of MLA1 and MLA2. It is also desirable to translate one MLA in the direction of spacing to correct for optical effects. Therefore, the optimally performant devices would include at least three axis actuation.

By translating MLA1 relative to MLA2 by an amount which is of the same order as the period (e.g. no greater than the period) of MLA1 and MLA2, the controller 22 is able to steer the beam 4 through an angle of at least 5 degrees, 10 degrees, 20 degrees, at least 40 degrees or at least 60 degrees, when implemented for coarse steering. If this method were used for fine steering (e.g. in combination with another separate mechanism (i.e. to effect coarse steering), such as one of the steering mechanisms which is known in the prior art), the minimum angle would be far lower (potentially less than 1 degree).

The actuator may also be operative to rotate (twist) MLA 1 with reference to MLA 2, i.e. such that they are no longer co-planar. This will result in the focusing unit 2 producing a divergent beam.

Figure 2:
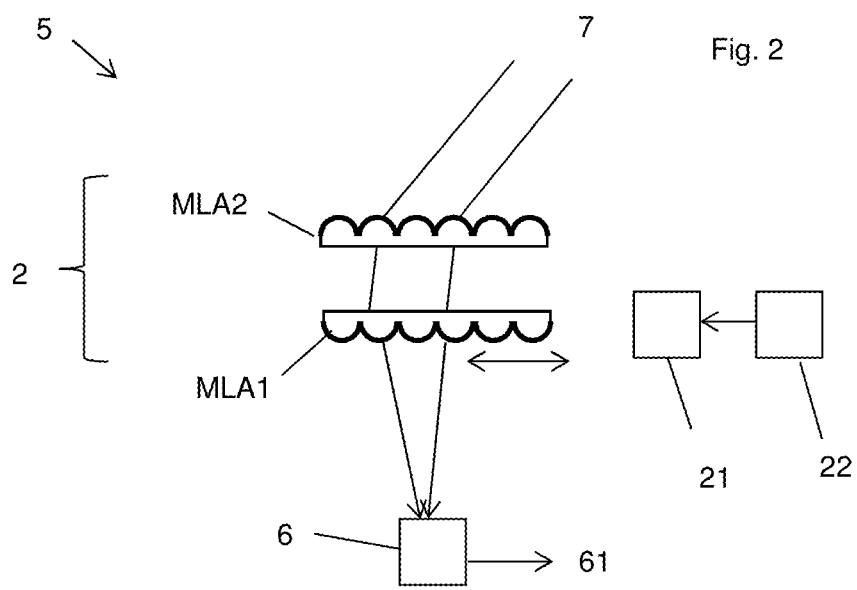
FIG. 2 shows schematically a receiver unit which is an embodiment of the first aspect of the invention, and incorporates the focusing device of FIG. 1.

FIG. 2 shows a second embodiment of the first aspect of the invention which is a receiver unit 5. Elements corresponding to elements of FIG. 1 are given the same reference numbers. In place of the EMR generation unit 3, the receiver unit 5 has a EMR capture unit 6 (EMR sensor) at a focal point of the focusing unit 2 which, when the EMR is modulated with a data signal, produces an electronic signal 61 modulated with the data signal. The focusing unit 2 focuses light which is incident on the MLA2 from a specific reception direction onto the EMR capture unit 6. EMR incident on substantially the whole area of the MLA2 from the reception direction can thus be collected by the EMR capture unit 61.

If the actuator 21 translates the MLA1 relative to the MLA2, even by a distance less than the period of the MLA1, the reception direction is changed.

If the actuator rotates (twists) MLA1 with respect to MLA 2, this gives a diverging set of input angles that will be transmitted on through the system. That is, the range of angles including the reception direction, such that light incident on the MLA2 at one of those angles can reach the EMR capture device 6, is increased. This will decrease the efficiency of the system whilst increasing the field of view.

In the embodiments of FIGS. 1 and 2, the movable MLA1 is closer to the EMR generation unit 3 or the EMR capture unit 6 than the static MLA2 (i.e. the MLA1 is "behind" the MLA2 as perceived from outside the units 1, 5). However, in a variation of the embodiments the positions of the MLA1 and MLA2 are reversed (i.e. the MLA1 is in front of the static MLA2).

In a further embodiment, both the EMR generation unit 3 and the EMR capture unit 6 are present, so that the unit can act both as a transmitter and a receiver for free-space optical communications. Optionally, the EMR generation unit 3 and the EMR capture unit 6 may operate simultaneously, e.g. in different respective (e.g. non-overlapping) frequency bands. The transmitted and received beams may have differing beam divergence.

Figure 3:
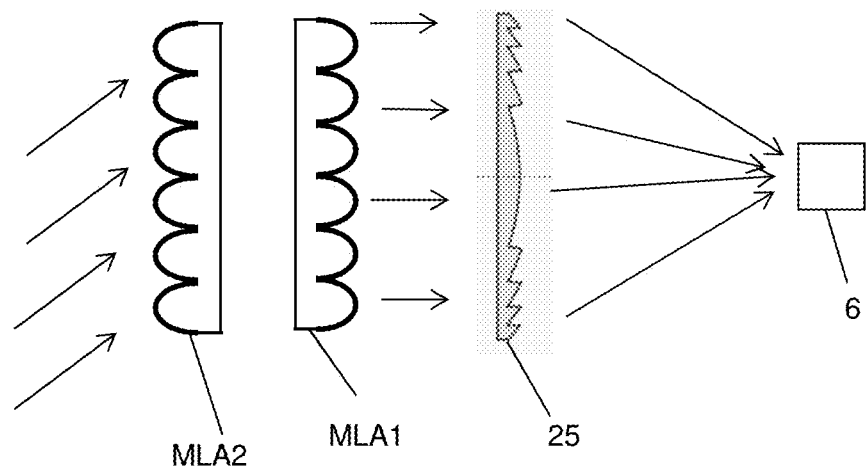
FIG. 3 shows a receiver arrangement which is a further embodiment of the first aspect of the invention.

Optionally, in either embodiment described a lens may be provided in combination with MLA1 and MLA2. An example arrangement is illustrated in FIG. 3, which shows the case of a receiver. A Fresnel lens 25 is positioned to receive the broad beam transmitted by MLA1, and concentrate it on the EMR capture unit 6. In this figure, the actuator for relatively moving the MLA1 and MLA2 is omitted for simplicity.

Note that the MLA1, MLA2 accept incoming light at relatively high acceptance angles, i.e. the transmission direction of the light has a high angle relative to the optical axis of MLA2, which may be considered as the direction transverse to the plane of MLA2. Furthermore, the output light transmitted by MLA2 is collimated normal to the planes MLA2. The wide collimated beam is condensed by the Fresnel lens 25.

In variants of the embodiment the Fresnel lens 25 may be replaced by multiple stacked Fresnel lenses.

In further variants the Fresnel lens(es) may be replaced by another sort of lens, such as a parabolic reflector. Additionally, an optical arrangement such as a collimating lens or ball lens may be positioned between the Fresnel lens 25 and the EMR capture unit 6 (especially if it is a camera), or to give an adequate spot on the focal plane where the EMR capture unit is positioned.

Advantages of the arrangement are that it provides low loss, a small focal plane, and a thin primary optics. The control movement and control inertia for achieving the beam steering are substantially smaller than for an equivalent aperture on a traditional telescope. Further, it is relatively easy to form an array composed of multiple arrangements as shown in FIG. 3 in a tiled arrangement due to the thin and light elements and a small focal plane. The output beam of the MLA1 has a low angular deviation from its normal axis.

Figure 4:
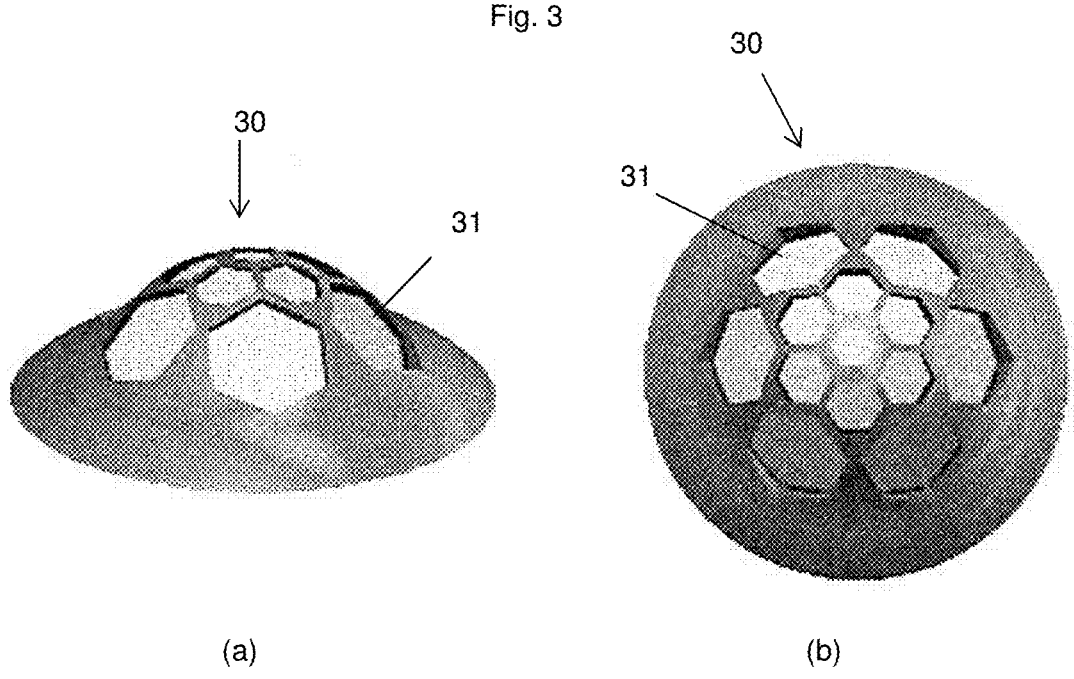
FIG. 4, which is composed of FIGS. 4(a) and 4(b), shows, respectively in perspective view and top view, a focusing unit which is an embodiment of the first aspect of the invention and comprises a plurality of tiles which are sets of MLAs.

FIGS. 4(a) and 4(b) are two perspective views of a focusing unit 30 having multiple (in this case 13) sets of MLAs 31, with offset respective normal directions. The sets of MLAs are maintained in this relative configuration by a support structure, which is illustrated as being a dome. Each set of MLAs includes a pair of MLAs which are mutually displaceable, and optionally further focusing components.

Each tile 31 may cover a field of regard of about 30 degrees. The presence of many tiles 31 allows a wide total field of regard, and multiplexing.

In future embodiments (not shown) the sets of MLAs may be tiled in other configurations, such as to cover a portion of a plane or structural surface. In arrangements with multiple sets of MLAs, they may be provided with respective EMR detector units, or may share a single EMR detector unit.

Note that in embodiments with titled sets of MLAs, signals encoding different information may be transmitted and/or received by different ones of the tiles. Thus, this provides a form of spatial division multiplexing (SDM).

Figure 5:
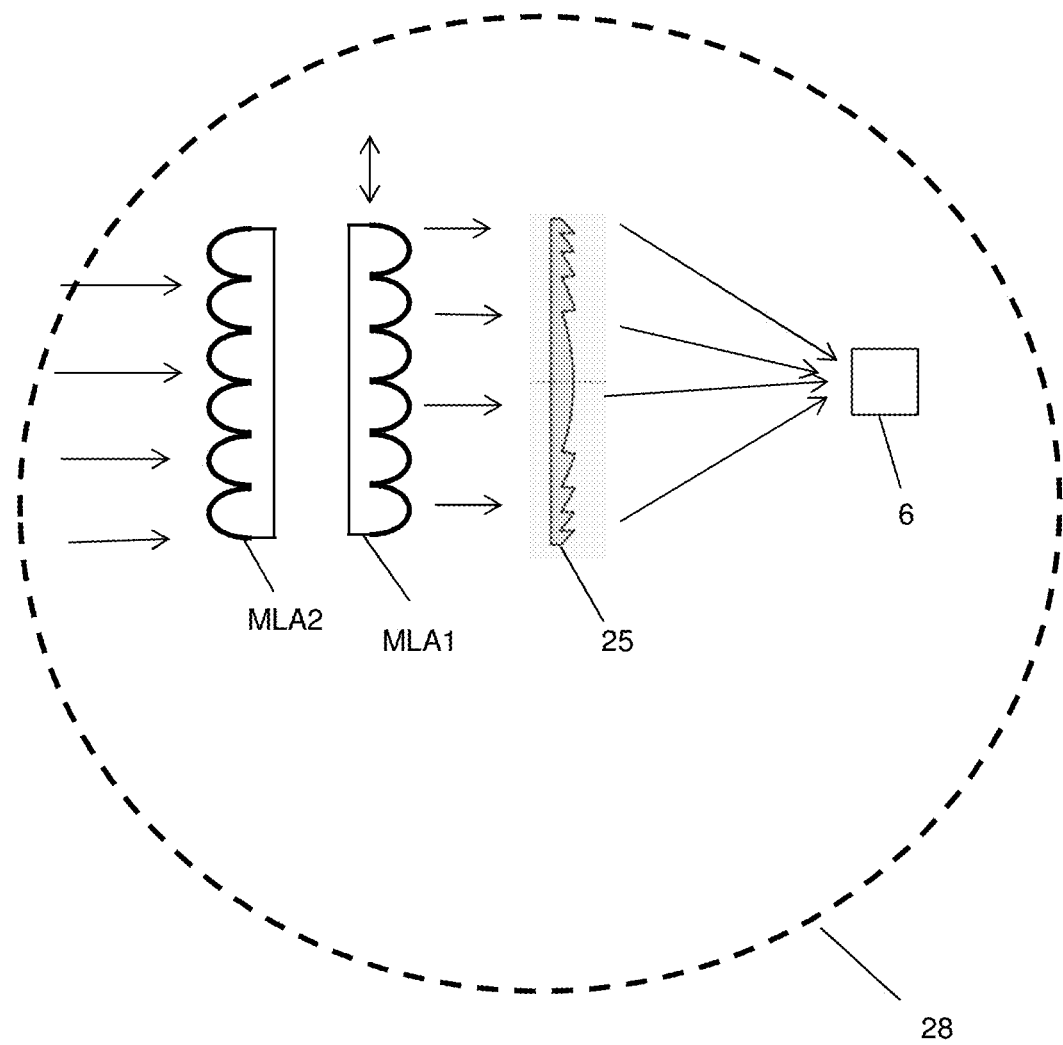
FIGS. 5-7 show further embodiments of the first aspect of the invention.

FIG. 5 shows a further embodiment which is a variation of the embodiment of FIG. 3 in which the MLAs 21, 22 and the Fresnel lens 25 are positioned at approximately the centre of a rotatable table 28 having an axis into the plane of the diagram. Such an embodiment has been used for performance characterisation of prototype devices. An actuator (not shown) is operative to displace the MLA2 in the directions shown by the double-headed arrow. The arrangement of FIG. 5 can be used to test the effects of relative movement of the MLAs, and the imaging quality of individual MLAs and the combination of two MLAs.

Figure 6:
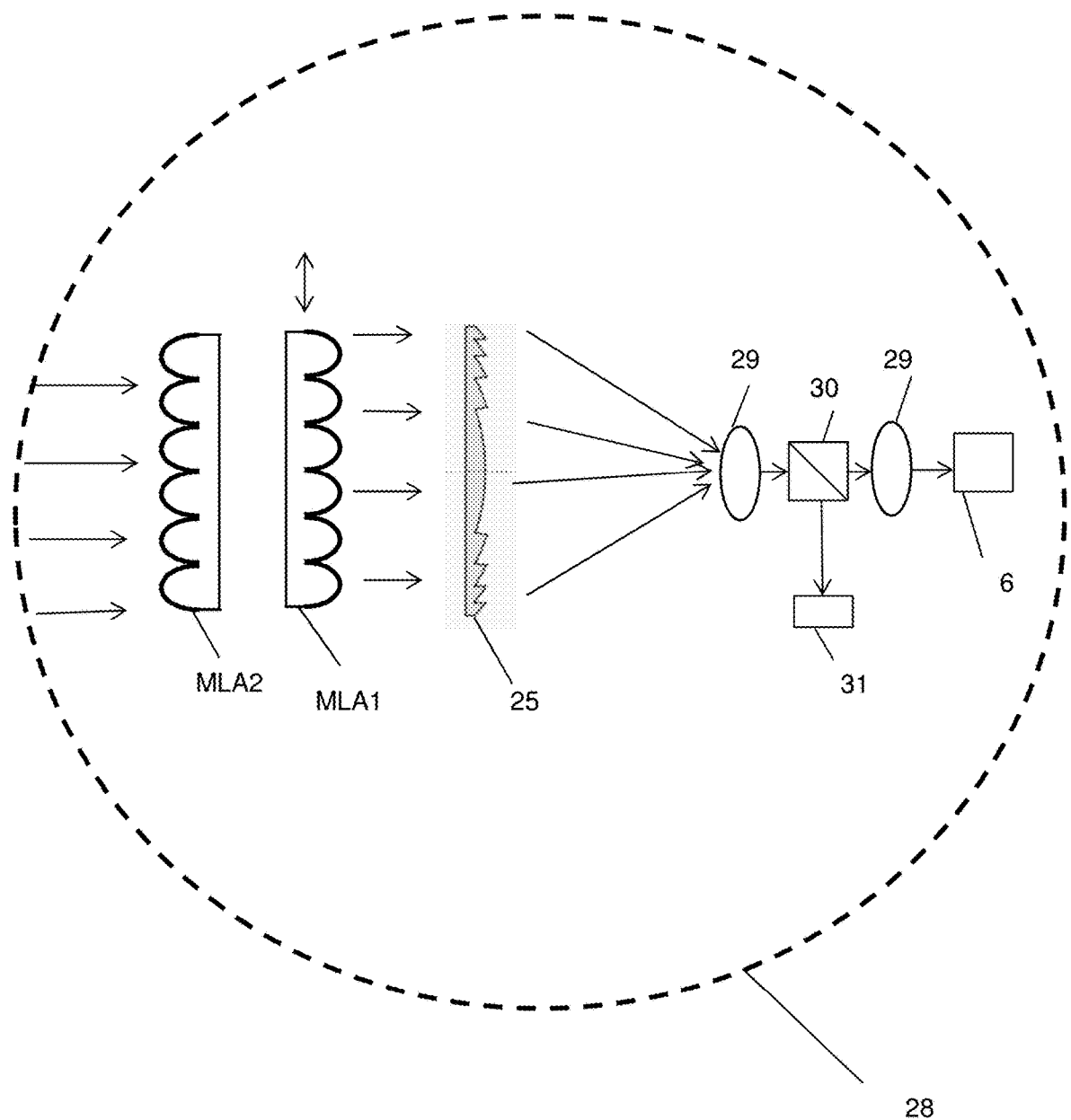

The embodiment of FIG. 6 differs from that of FIG. 5 in that between the Fresnel lens 25 and the EMR detector unit 6 is an optical arrangement comprising two lenses 29 and a beam-splitter 30. The beam-splitter 30 divides a portion of the beam passing through it to a positional detector 31. The embodiment may be used for testing auto-alignment of the MLAs using the positional detector 31. The output of the positional detector 31 may be used to control the actuator which moves one of the MLAs. Alternatively, a small dedicated detector may be provided and used to control the actuator, for example a detector with set off-axes and making use of a further beam splitter. For example, about 10% of the incoming light may be directed to a quadrant detector, to ensure the rest of the light hits a system pointing directly at it.

Figure 7:
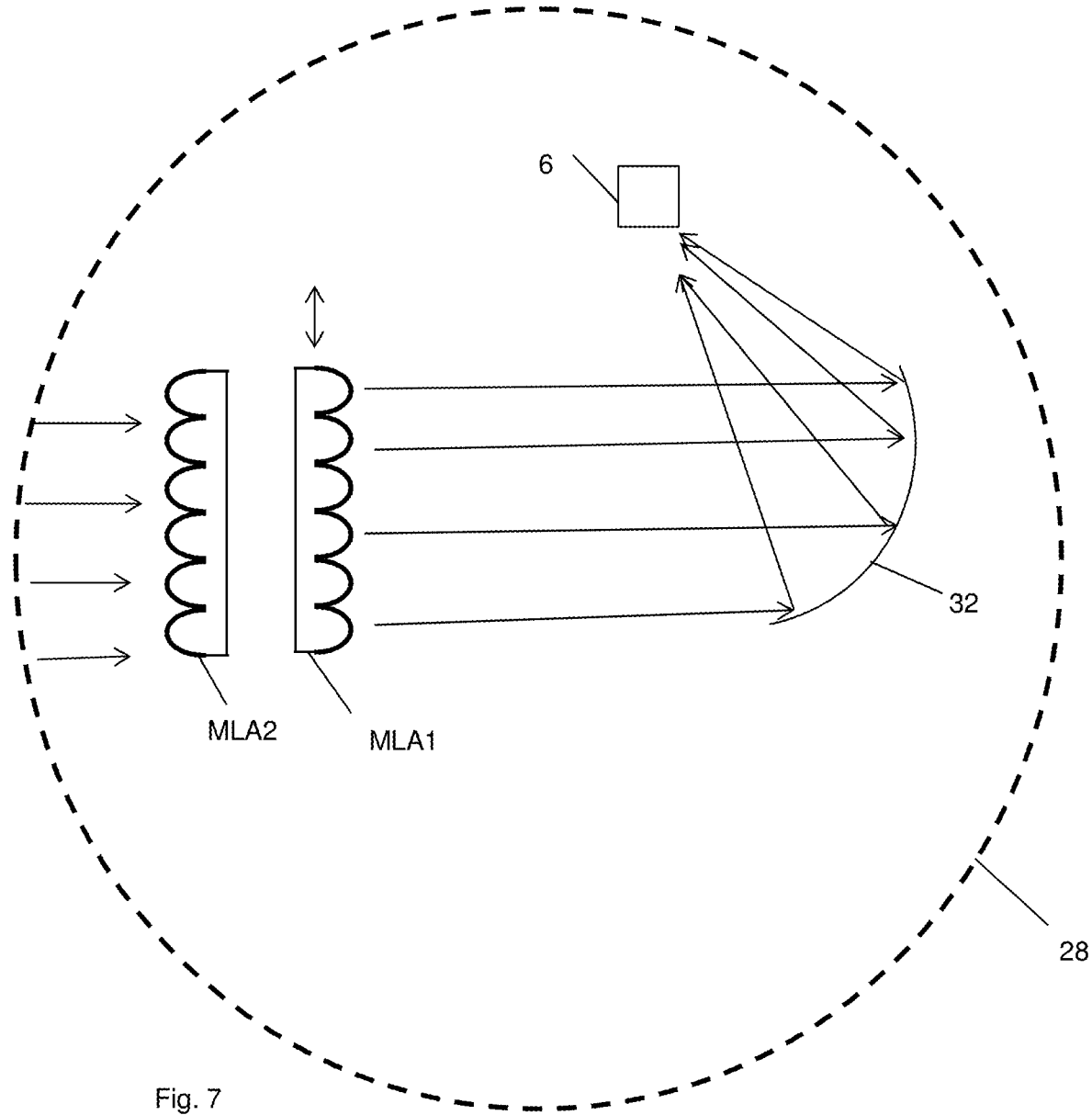

The embodiment of FIG. 7 differs from that of FIG. 5 in that the Fresnel lens 25 is replaced with a parabolic reflector 32. This arrangement, like that of FIG. 5, may be used for testing the effects of relative movements of the MLAs, and the imaging quality of individual lens arrays and the combination of different arrays.

In FIGS. 5-7, the EMR detector unit 6 is a detector camera, that is a device which can form a 2-D image. However, the detector camera may, in other embodiments, be replaced by a detector having only one pixel, or a small number of pixels. In these figures, the angular circular table 28 also is used to vary the incidence angle in a controlled manner for test.

Although the MLAs in the embodiments described above are substantially planar, the first aspect of the invention is not limited in this respect. Specifically:

One or both of the MLAs may include a planar face.
One or both of the MLAs may include a convex face.
One or both of the MLAs may include a concave face.
One or both may be double-convex, plano-convex etc too.
All combinations of the above possibilities may be used.

As noted above, the embodiments described above include an actuator. The actuator may be controlled using a control loop to direct translation and/or rotation.

In the case of embodiments which, as described above, can act both as transmitters and reflectors, the transmission and reflection may have the same divergence or different divergence.

Note that in a variation of the embodiments, the MLA's may be replaced by other lens arrays, e.g. of at least 3 lenses, at least 5 lenses or at least 10 lenses.

In principle, it would also be possible to implement the embodiments using respective single lenses of any type to replace each of the lens arrays, though some advantages of the method would be lessened if the laterally translated element was a single solid lens (low cost, lightweight, simpler control).

(ii) Second Aspect

As discussed above, a second aspect proposes that a plurality of electromagnetic radiation capture units are positioned in relation to a focusing unit such as a dome, such that incoming electromagnetic radiation incident on the dome is deflected by it, to reach each of the capture units with a different timing and intensity. The profile for the timings and intensities can be determined for a given transmitter using a calibration signal, and the profile is then used to extra data from data signals transmitted by the transmitter.

Turning to FIG. 8, a communication system which is an embodiment of the second aspect of the invention is shown, comprising a receiver unit which is an embodiment of the present invention.

The communication system comprises two transmitter units 101,102, each of which contains one or more transmitters. As illustrated, the first transmitter unit 101 contains two EMR transmitters 101a, 101b, and the second transmitter unit 102 comprises a single transmitter 102a. The receiver 103 of the communication system includes one or more receivers. For simplicity, two receivers 103a, 103b are shown. The transmitter units 101, 102 have different respective positional relationships with the receiver unit 103. The electromagnetic radiation referred to is typically radiation with a frequency in the microwave band (e.g. at least 300 MHz) or higher frequencies, such as the visible light band (430-750 THz). In particular, the EMR may be infrared radiation, in the range 300 GHz (1000 micrometers) to 430 THz (700 nanometers), such as 1550 or 1064 nanometers.

In use, each of the transmitter units 101, 102 generates and transmits (e.g. in all angles, or generally towards the receiver unit 3) both a calibration signal (having a low or zero data rate) and a data signal. At least the data signal is modulated, and the data signal has a higher data transmission rate than the calibration signal. For example, the transmitter unit 101 may generate the calibration signal using transmitter 101a and the data signal using the transmitter 101b, and the two may be transmitted (e.g. at slightly different frequencies) simultaneously. The transmitter unit 102 may transmit the calibration signal and the data signal at different times, e.g. alternately.

The receiver arrangement may use two identical optical collectors with different EMR capture devices (detectors). One assembly is tuned to receive the data signal wavelength and the other tuned to receive the distinct calibration signal wavelength. Alternatively, they may use multiple sets of detectors under a common optical collector, as illustrated in FIG. 9.

Figure 9:
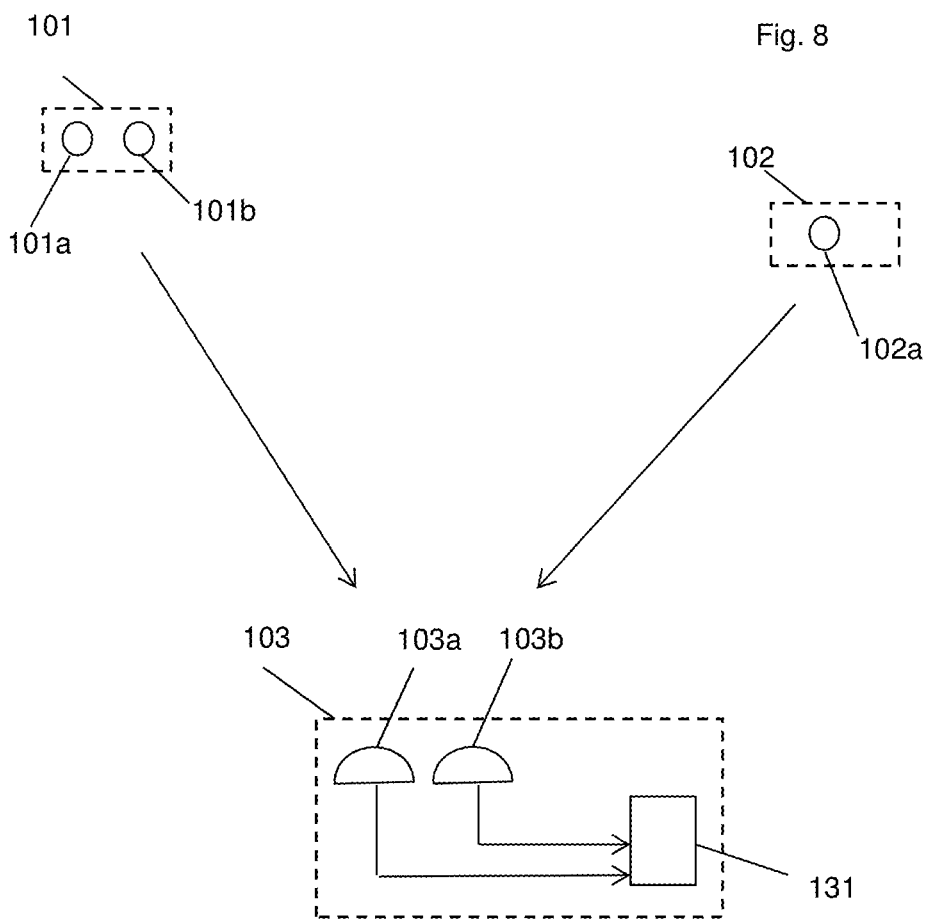
FIG. 9 shows a receiver of the communication system of FIG. 8.
Figure 10:
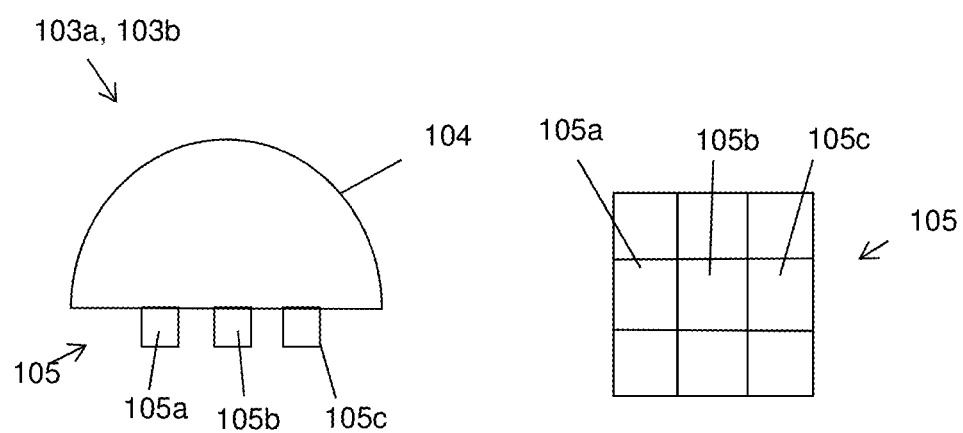
FIG. 10 shows an array of EMR capture units in the receiver of FIG. 9.

FIG. 9 shows in cross-section the structure of each of the receivers 103a, 103b of receiver unit 3. It comprises a domed focusing unit 104 which may be a domed Frensel lens, or a reflective mirror, or other focusing arrangement. The dome 104 is transparent to the frequency (or respective frequencies) of the calibration signal and the data signal, and operative to refract any ray incident on the dome such that is propagates in a new direction which depends upon the angle between the original propagation direction of that ray and the dome surface. In a focal plane of the focusing unit 104 is a one- or two-dimensional array 105 of EMR capture units 105a, 105b, 105c. A front view of a possible two-dimensional array 105, which is a 3×3 array, of EMR capture units, is shown in FIG. 10. The receivers 103a, 103b provide a wide-range receptive field.

Upon the transmission of the calibration signal by one of the transmitter units (say, the transmitter unit 101), a calculation unit 131 of the receiver unit 103 receives individually the output of each of the EMR capture units 105a, 105b, 105c for at least one of the receivers 103a, 103b. From it, and using knowledge about a format of the calibration signal (e.g. that it is a pulse of EMR followed by a gap period in which no EMR is transmitted), the calculation unit 131 determines a profile for the corresponding transmitter unit 101, indicating the wave distortion for each of the EMR capture units 105a, 105b, 105c, and the power distribution over the set of EMR capture units 105a, 105b, 105c. The structure of the receivers 103a, 103b is substantially identical, and the receivers are also oriented in the same direction. Since the distances between each of the transmitter unit 101, and the receiver unit 103, and between the transmitter unit 101 and the transmitter unit 102, are both much greater (e.g. at least 100 times greater) than the distance between the transmitters 101a, 101b or the receivers 103a, 103b, each of the transmitters 101a, 101b produces substantially the same profile (a first profile) in each of the receivers 103a, 103b. Similarly, the transmitter 102a produces substantially the same profile (a second profile, different from the first profile) in each of the receivers 103a, 103b.

Upon transmission of the data signal from one of the transmitter units 101, 102, the calculation unit 131 of the receiver unit 103 receives individually the output of each of the EMR capture units 105a, 105b, 105c for at least one of the receivers 103a, 103b. From it, and the corresponding profile, the calculation unit 131 resolves data modulated onto the data signal.

Each of the EMR capture units 105a, 105b, 105c for each of the receivers 103a, 103b of the receiver unit 103 may be able to output a signal representing the amount of EMR it receives which is in each of multiple frequency ranges. Alternatively, different ones of the capture units 105a, 105b, 105c of the receiver unit 103 may be sensitive to different EMR frequency ranges. For example, this may be because different ones of the capture units 105a, 105b, 105c may be provided with EMR filters at their inputs which transmit the corresponding different respective frequency ranges. In either case, the receiver unit 103 may obtain a profile using a calibration signal sent using a first of the frequency ranges, and obtains data using the profile from a data signal sent (e.g. simultaneously) at a second one of the frequency ranges.

In the case that the receiver unit 103 contains multiple receivers 103a, 103b, optionally the EMR capture units of one of the receivers 103a, 103b may be sensitive to a first EMR frequency range (e.g. because they contain a first type of filter), and the EMR capture units of anther one of the receivers 103a, 103b may be sensitive to a second, different EMR frequency range (e.g. because they contain a second type of filter). Alternatively, one or more of the receivers 103a, 103b of the receiver unit 103 may contain may contain a first plurality of EMR capture units sensitive to EMR radiation in the first of the frequency ranges, and a second plurality of EMR capture units sensitive to EMR radiation sensitive to the second one of the EMR frequency ranges. In this case, the first and second EMR capture units are preferably interleaved with each other (e.g. in a chess board pattern), such that each plurality of the EMR capture units collectively samples a statistically similar sub-set of the total area of the receiver which is sensitive to incoming EMR radiation.

Note that the receiver unit 103 may in fact only contain one receiver (not the two depicted in FIG. 3), and in this case it may contain a first plurality of EMR capture units sensitive to EMR radiation in the first of the frequency ranges, and a second plurality of EMR capture units sensitive to EMR radiation sensitive to the second one of the EMR frequency ranges, preferably interleaved with each other.

In the case that both the transmitter units 101, 102 transmit data signals simultaneously, even at the same EMR frequency, the calculation unit 31 is operative, based on the outputs of the EMR capture units 105a, 105b, 105c for at least one of the receivers 103a, 103b, and on the respective profiles of the transmitter units 101,102 to resolve the two data signals, and then to extract the modulated data from them.

The resolution process may resemble the resolution process performed in a conventional CDMA (code division multiple access) communication system, in which each of multiple transmitters transmits data with a pattern multiplied by a known respective code. In the present embodiment, the profile of each respective transmitter unit 1,2 plays a role analogous to the role which the code for a given transmitter plays in a conventional CDMA system.

Figure 11:
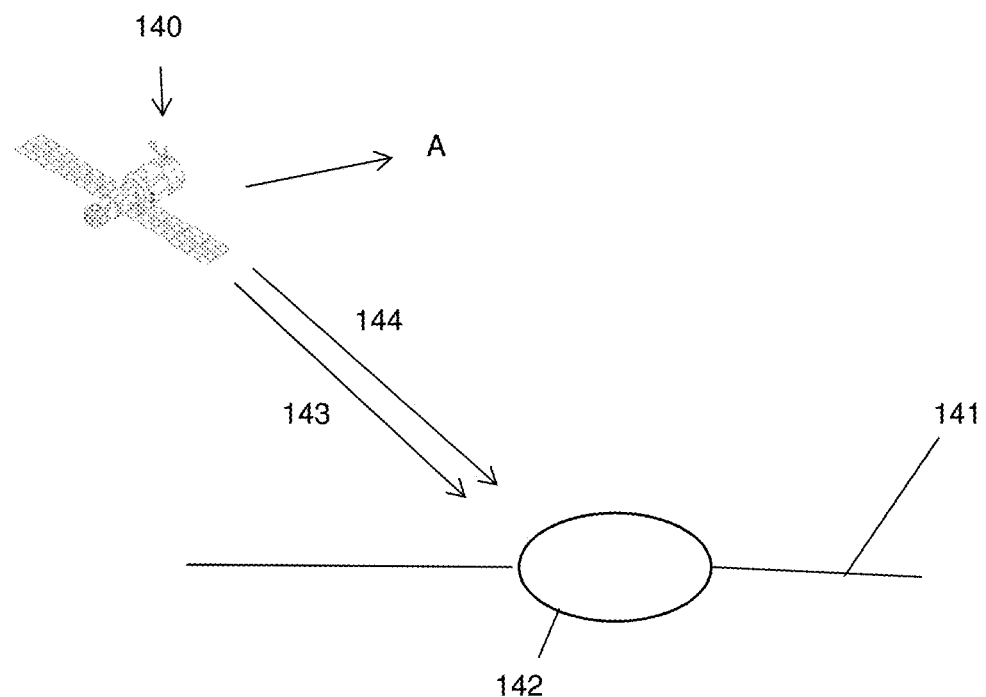
FIG. 11 shows a use case for the second embodiment of FIG. 8.

Turning to FIG. 11, a use case is shown of an embodiment of the second aspect of the invention. A satellite 140 moves through the sky along a trajectory labelled by arrow A. On the ground 141 is a communications signal receiver comprising an array 142 of one of more receivers (which may be of the type shown in FIG. 9), each having a plurality of EMR capture units. The receivers provide collection optics. The satellite transmits two EMR signals, a data signal 143 and a calibration signal 144, both of which are received by the EMR detector array 142. It is desirable for data carried in the data signal 143 to be received by the receiver without tracking the position of the satellite 140, with a high data rate benefiting from spatial division multiplexing (SPM) over the various spatial positions of the EMR capture units within the receivers.

A conventional communications signal receiver, instead of the receiver array 142, would have telescopic detection optics, for concentrating all the EMR received from the satellite 140 onto a small area, typically provided with a fast detector. The telescope has to track the position of the satellite, such that EMR enters the aperture of the telescope. The EMR rays arrive with similar path lengths, so there is minimal disruption to the wavefront timing. The power distribution for each rate over the surface of the aperture of the telescope will be similar, or at least not a significant design factor.

Figure 12:
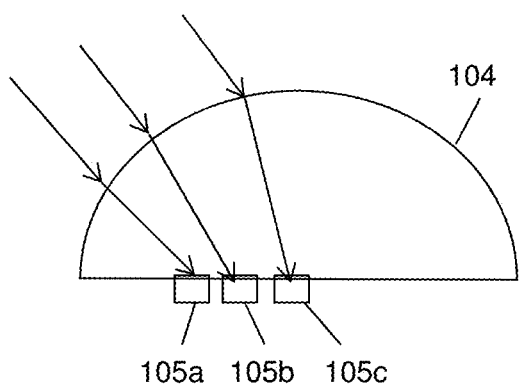
FIG. 12 shows the paths of rays incident on the receiver of FIG. 9.

By contrast, FIG. 12 illustrates how EMR rays from the satellite are received by a receiver of the kind shown in FIG. 9 in an embodiment of the invention. As will be seen from the description below, the embodiment does not need to track the position of the satellite. The nature of the wide aperture and the wide acceptance angle means that EMR rays are not concentrated onto as small an area as is achieved with the conventional tracked optics (with their narrower field of view). The light rays arrive at the EMR capture units 105a, 105b, 105c with different path lengths, and therefore far more disruption to the wavefront timing than normally seen by telescopes (widely varying path lengths mean ray incidence timing may be spread over multiple 'bit' durations in the data signal). The power distribution for each ray at the domed focusing unit 104, which constitutes the aperture, is different. Some rays contact the dome 104 in a normal direction, while others make a glancing angle with the dome and will tend to be received by one of the capture units 105a, 105b, 105c with a lower intensity. Thus, the transmission losses for the rays reaching the capture units 105a, 105b, 105c are significantly different. This results in a spread of both the power and timing of the rays striking the capture units 105a, 105b, 105c.

The capture units 105a, 105b, 105c therefore receive signals from the satellite with respective timing and intensities which constitute a profile for the satellite which depends upon the position of the satellite. This profile is determined using the calibration signal. Once it is, the profile can be used when the data signal is received to correct the outputs of the capture units 105a, 105b, 105c to compensate for the different timings and intensities. This makes is possible to combine the corrected outputs of the capture units 105a, 105b, 105c, to improve the signal to noise ratio. Since the corrected outputs are correlated because they encode the same data, combining the corrected outputs of the capture units 105a, 105b, 105c means that random noise each of them is subject to tends to cancel out. Thus, the signal to noise ratio is increased.

This is distinct from wavefront distortion correction or pre-distortion, which counteracts much smaller differences in timing or energy distribution before conversion to electrical signal (typically using mechanical means).

Furthermore, if the receiver receives signals from multiple satellites during a certain time period, each will have a different respective profile. Thus, so long as the signals are separated in transmission direction and/or time, and so long as the outputs of the capture units 105a, 105b, 105c are sampled much faster than the incoming data rates, it is possible to receive multiple signals at once using the same receiver. This "multiplexing" can be achieved by either spatial and/or temporal separation.

In principle, if the two satellites are located in same direction from the receiver and transmit in synchronicity they may still block each other out. In practice, though, for the use case of FIG. 11, it is unlikely that the positions of the satellites in the sky will be the same, and their communication signals are unlikely to be synchronised. Even if, by chance, they were synchronised, the movement of each satellite across the sky would be different, and would there cause the timing of the transmitters to become different over time. Thus, the only way in which interference would persist is if the satellites were, to the resolution of the spatial field and the temporal sampling, in the same place, on the same path and synchronised.

Optionally, each receiver may have the following variations:

- They may each have two or more similar sets of receiving optics;
- They may have a variable filter, which is controllable, allowing the receivers to have different filter settings when the respectively act as calibration, hybrid and data signal detectors. Here hybrid signals refer to simultaneous data and calibration signals.
- The focusing units may be provided as domes, and in particular as Fresnel domes, which reduce the focal plane, e.g. coinciding with or proximate a plane containing the capturing units within the dome. However, Fresnel domes may not be used in all embodiments.
- The receivers may each have capture units of multiple types. For example, the capture units may have different respective filters for incoming EMR. For example, some capture units may have a filter which transmits EMR in the frequency of the calibration signal, while other capture units may have a filter which transmits the different frequency of the data signal. Optionally, other capture units may have a filter which transmit both frequencies. The variation in between the capture units may accentuate the profile, making it easier to detect the data signal and/or to distinguish incoming communication signals from different satellites. The capture units of different types may be interleaved within the receiver, e.g. in a regular pattern (such as a chess board, if there are two types of capture units) or a random pattern.
- While as explained above, no tracking is required, optionally the present techniques may also be used in combination with tracking, to allow receivers with narrower fields of view, which are directed by a control system, to be pointed in the direction of a satellite. This would also permit multiplexing to a higher resolution.

While the embodiment is typically used (i.e. in a baseline) with all capture units in the array of receivers being sampled, this may involve significant effort to capture and store the data in real time. Optionally, this burden can be reduced by post processing of the data (i.e. the signals are captured in real time, but only processed later). Alternatively or additionally, only a sample of the outputs of the capture units in the array may be collected in an active window.

A possible way of operating the transmitter is to transmit the data and calibration signals on different frequencies, and this may be regarded as a "baseline". The baseline may for example use the frequencies 1550 nm and 1064 nm, which are popular wavelengths. The data signal may be transmitted at a high data rate (e.g. at least 250 Mbps, or at least 500 Mbps), while the calibration signal may be transmitted on the other channel at a lower rate (e.g. below 250 Mbps, or below 200 Mbps).

The calibration signal may be transmitted in pulses, e.g. with gaps between the pulses which are longer than the pulses (a short duty cycle). Pulsing the calibration signal may allow each pulse to be transmitted with higher power. For example, a 5% duty cycle means that peak power can be 20 times higher than average, which is much easier to detect. As described above, the calibration signal is used to obtain a profile which is used for correction of wavefront distortion/timing, and/or each of the capture units receiving a different power intensity.

The transmitter (e.g. on the satellite) may also be provided with a variable filter, which is controllable such that that they may operate with different filter settings when they respectively transmit calibration, hybrid and data signals. The transmitters may be arranged to transmit the data and calibration signals either sequentially or alternatively. Each transmission of the calibration signal allows the receiver to set up a profile, and then the profile is used to receive the data signal. This would allow rapid correction of variations in the profile, e.g. caused by changing atmospheric conditions, and may be used even in the baseline case in which the calibration signal and data signal use different frequencies. The transmitter alternating between calibration and data signals has the disadvantage of reducing the data rate, but reduces the mass and power required by the transmitter, which is important when the transmitter is provided on a spacecraft.

A possible method for operating an embodiment is as follows:
1) Detect the calibration signal
2) Measure the outputs of each capture unit (pixel) of a given receiver which is operative to receive the calibration signal.
3) Determine the timing and relative power for the pixels for the capture signal (i.e. the profile).
4) Determine the timing and relative power for the data pixels (i.e. the capture units which are operative to receive the data signal). This can be done by interpolation based on the profile obtained in step 3. Step 4 may be based on a PSF (point spread function for different angles which is pre-known (e.g. from laboratory calibration).
5) Using the results of (4), correct the outputs of the data pixels.
6) Extract data from the outputs of the data pixels. This may include seeking rising or falling edges in the signal, or by measuring raw power. The edge detection may use split averages. That is, given a time-varying output from a data pixel, the edge detection may form a number of candidate times at which the edge might occur, and for each candidate it works out the average of the signal before the candidate time, and the average of the signal after the candidate time. The different between these two averages is calculated, and the candidate time is selected for which this difference is greatest.
7) Weight each of the data elements obtained in step 6) based on the relative power objected in step (4). This may be done linearly or otherwise.
6) Combine the weighted data elements (e.g. simply by adding them, but other combination methods are possible), thereby increasing the signal-to-noise ratio.

Embodiments of the second aspect of the invention may have the following variations from what is described above:
Basic (direct calibration)—two signals transmit simultaneously, different detectors spaced out over same area
Separated signals (calibration through calculation)—calibration signal is sent separately to data signal. A number of calibration detectors allow calculation of the position and velocity vector of the transmitter (possibly sent with low data rate message). Once acquisition is complete, the signal detector field allows corrections based on calculated
Selective reception on different pixels—define path that transmitter will take over the detector array and then selectively sample only those detectors that will receive high signal to noise ratio.
Post-process—Capture everything and apply post processing using the calibration signal afterwards (possibly at a different point in the data pipeline, at a relay or data aggregation point)
Multiple transmitters—can transmit both calibration and data signals concurrently if desired.
Single transmitter—unless acting as multiple transmitters or using power separated signals, the single transmitter option is usually (but not necessarily) considered constrained to transmitting one signal type at any one time.
Dual use detectors—use filters or vary integration time (i.e. sampling or exposure time) for detectors to allow them to detect either or both signals.
Multiple detector types—detectors dedicated to one signal type or the other.
Wavelength separated signals—1550 nm and 1064 nm are the most common for space application. Ideally adjacent wavelengths would be used for calibration and data (e.g. 1550 and 1560), but other wavelengths can be used. Multiple signals at different polarisations may give even more precise knowledge of the data signal's distortion over the transmission distance.
Polarisation separated signals—the signals can be the same wavelength, separated by polarisation. Multiple signals at different polarisations would give even more precise knowledge of the data signal's distortion over the transmission distance.
Power separated signals—signals are same wavelength (to resolution of detector filters) and no meaningful use of polarisation is made. Calibration signal is high powered and raises whole noise floor in band.

Figure 13:
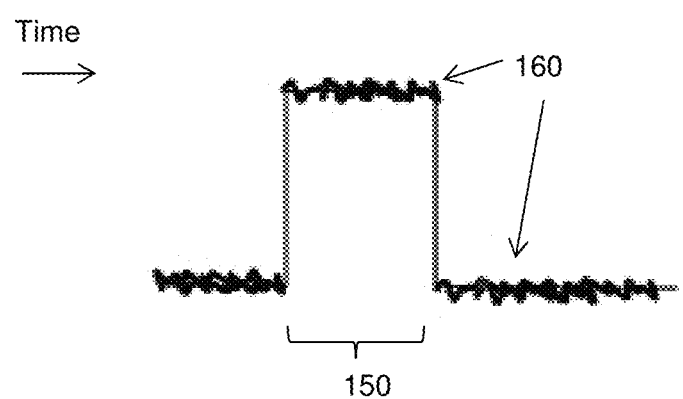
FIG. 13 shows the time-profile of a signal received by an EMR capture unit of the receiver of FIG. 9 in an example method of the operating the embodiment.

In one form of the embodiment, the calibration signal may be transmitted with high power but a low duty cycle, while the data signal is sent at the same wavelength but with a much higher data rate. In this case, the varying output of one of the EMR capture units might be as shown in FIG. 13. It includes a high amplitude pulse 150 which is a pulse of the calibration signal 144, and, throughout the time depicted in FIG. 13, a high data rate, lower amplitude signal 160 due to the data signal 143. The timing of the pulse will be different in different areas of the detector field due to the large optical collection aperture and wide angle acceptance. When power and timing inputs are used to align and weight the data signal detector outputs, the data signal can be reconstructed.

The invention claimed is:

1. A data transmission method for an optical communications system comprising at least one transmitter unit and a receiver unit, the receiver unit comprising at least one receiver which comprises a set of two or more electromagnetic radiation (EMR) capture units and a focusing unit for focusing EMR onto the corresponding set of EMR capture units, the method comprising:
   each transmitter unit transmitting at least two EMR signals to the receiver unit, including a calibration signal and a data signal, the calibration signal having at least one characteristic which is different from the data signal;
   the receiver unit using outputs of the EMR capture units when the calibration signal is incident on the receiver unit, to determine a corresponding profile for the transmitter unit, the profile indicating wave front distortion and power distribution over the EMR capture units of EMR transmitted by the transmitter unit; and
   the receiver unit processing data from the outputs of the EMR capture units when a data signal from the corresponding transmitter unit is incident on the receiver unit, and using the profile for the transmitter unit, to obtain data from the data signal.

2. The method of claim 1 in which the calibration signal is transmitted at a different time from the data signal.

3. The method of claim 1 in which the calibration signal is transmitted simultaneously with the data signal.

4. The method of claim 1 in which the focusing unit of each receiver of the receiver unit is operative to direct EMR onto the corresponding set of EMR capture units which is incident on the focusing unit in range of incident angles which is at least 5 degrees wide.

5. The method of claim 1 in which the focusing unit of each receiver of the receiver unit is a dome covering the set of EMR capture units.

6. The method of claim 1 further comprising:
   upon a plurality of the transmitter units transmitting calibration signals, obtaining a respective profile for each transmitter unit; and
   upon the transmitter units transmitting respective data signals simultaneously, resolving the data signals from each other using the respective profiles.

7. The method of claim 1 in which the at least one characteristic is that the calibration signal has a lower data transmission rate than the data signal.

8. The method of claim 1 wherein polarisation is used to distinguish signals or data.

9. The method of claim 1, wherein the two or more EMR capture units are arranged in a two-dimensional array.

10. A receiver unit for an optical communications system, the receiver unit comprising:
    at least one receiver which comprises a set of two or more EMR capture units and a focusing unit for focusing EMR onto the corresponding set of EMR capture units; and
    a calculation unit operative:
    upon a calibration signal from a transmitter unit being incident on the receiver unit, to determine a corresponding profile for the transmitter unit which indicates wave front distortion and power distribution over the EMR capture units; and
    upon a data signal from the transmitter unit being incident on the receiver unit, to process data from the outputs of the EMR capture units, using the profile for the transmitter unit, to obtain data from the data signal.

11. The receiver unit of claim 10 in which the focusing unit of each receiver of the receiver unit is operative to direct EMR onto the corresponding set of EMR capture units which is incident on the focusing unit in range of incident angles which is at least 5 degrees wide.

12. The receiver unit of claim 10 in which the focusing unit of each receiver of the receiver unit is a dome covering the set of EMR capture units.

13. The receiver unit of claim 10 in which a plurality of the EMR capture units are provided with a respective filter, different ones of the filters having different transmission characteristics.

14. The receiver unit of claim 10, in which the calculation unit is further operative:
    upon a plurality of the transmitter units transmitting calibration signals, to obtain a respective profile for each transmitter unit; and
    upon the transmitter units transmitting respective data signals simultaneously, to resolve the data signals from each other using the respective profiles.

15. The receiver unit of claim 10 which is configured to employ polarisation to distinguish signals or data.

16. An optical communications system comprising at least one transmitter unit and a receiver unit,
    each transmitter unit being configured to transmit at least two EMR signals to the receiver unit, including a calibration signal and a data signal, the calibration signal having at least one characteristic which is different from the data signal;
    the receiver unit comprising:
    at least one receiver which comprises a set of two or more EMR capture units and a focusing unit for focusing EMR onto the corresponding set of EMR capture units; and
    a calculation unit operative:
    upon a calibration signal from a transmitter unit being incident on the receiver unit, to determine a corresponding profile for the transmitter unit which indicates wave front distortion and power distribution over the EMR capture units; and
    upon a data signal from the transmitter unit being incident on the receiver unit, to use data from the outputs of the EMR capture units, and the profile for the transmitter unit, to obtain data from the data signal.

17. The optical communications system of claim 16 in which the focusing unit of each receiver of the receiver unit is operative to direct EMR onto the corresponding set of EMR capture units which is incident on the focusing unit in range of incident angles which is at least 5 degrees wide.

18. The optical communications system of claim 16 in which the focusing unit of each receiver of the receiver unit is a dome covering the set of EMR capture units.

19. The optical communications system of claim 16 in which a plurality of the EMR capture units are provided with a respective filter, different ones of the filters having different transmission characteristics.

20. The optical communications system of claim 16 in which the calculation unit is further operative:
    upon a plurality of the transmitter units transmitting calibration signals, to obtain a respective profile for each transmitter unit; and
    upon the transmitter units transmitting respective data signals simultaneously, to resolve the data signals from each other using the respective profiles.

21. The optical communications system of claim 16 which is configured to employ polarisation to distinguish signals or data.

* * * * *